United States Patent
Satake et al.

(10) Patent No.: US 7,008,662 B2
(45) Date of Patent: Mar. 7, 2006

(54) PRODUCING METHOD AND PRODUCING APPARATUS OF RICE WITH GERMINATED GERMS

(75) Inventors: Toshiko Satake, Tokyo (JP); Shigeharu Kanemoto, Tokyo (JP); Yukihiro Kawano, Tokyo (JP); Nobuhiro Matsumoto, Tokyo (JP); Kazuo Hironaka, Tokyo (JP)

(73) Assignee: Satake Corporation, Tokyo (JP)

( * ) Notice: Subject to any disclaimer, the term of this patent is extended or adjusted under 35 U.S.C. 154(b) by 351 days.

(21) Appl. No.: 10/261,585

(22) Filed: Oct. 2, 2002

(65) Prior Publication Data
US 2003/0064132 A1  Apr. 3, 2003

(30) Foreign Application Priority Data
Oct. 3, 2001 (JP) ............................. 2001-307089

(51) Int. Cl.
*A23L 1/10* (2006.01)
(52) U.S. Cl. ..................... 426/618; 426/455; 426/456; 426/459; 426/462; 426/506; 426/507
(58) Field of Classification Search ................ 426/618, 426/455, 462, 456, 460, 461, 459, 507, 506
See application file for complete search history.

(56) References Cited

U.S. PATENT DOCUMENTS 6,210,734 B1 * 4/2001 Jun ........................... 426/523
6,610,345 B1 * 8/2003 Satake et al. ................ 426/483
6,630,193 B1 * 10/2003 Aoto et al. .................. 426/627
6,685,979 B1 2/2004 Toyoshima et al.

FOREIGN PATENT DOCUMENTS

| JP | 4-4851 | 1/1992 |
| JP | 2000-93097 | 4/2000 |
| JP | 2001-259441 | 9/2001 |
| JP | 2001-259447 | 9/2001 |
| JP | 2002-1138 | 1/2002 |
| WO | 00/45646 | 10/2000 |

OTHER PUBLICATIONS

Taiwanese Office Action dated Sep. 20, 2004.

* cited by examiner

Primary Examiner—Lien Tran
(74) Attorney, Agent, or Firm—Staas & Halsey LLP

(57) ABSTRACT

Warm and wet air are applied to brown rice with germinated germs, produced by adding water to the brown rice, for removing water attached to a surface of the rice. A surface of the germinated brown rice is polished by a rice-polishing machine while remaining the germinated germs to obtain rice with germinated germs. Water of about 1 to 10% of rice weight is added to soften the rice surface. The rice and granules whose granule size is set to a constant granule size smaller than that of the rice and which is heated to 60° C. or higher are mixed with the rice and stirred. Rice bran remaining on a rice surface after polishing is absorbed by the granules and is removed. And, the rice and granules are separated from each other.

2 Claims, 2 Drawing Sheets

PRODUCING METHOD AND PRODUCING APPARATUS OF RICE WITH GERMINATED GERMS

BACKGROUND OF THE INVENTION

1. Field of the Invention

The present invention relates to a producing method of rice with germinated germ in which mouthfeel, outward appearance, digestibility and cooking easiness are enhanced, and it need not to washed before cooking.

2. Description of the Prior Art

In recent years, germinated brown rice has received attention as healthy tendency is increased because it is rich in nutrition such as γ-aminobutyric acid (GABA) and ferulic acid which lower blood pressure and stabilize mentality. However, brown rice is inferior in cooking easiness, and in order to enhance ease of eating of the rice, it is considered that germinated brown rice is polished to remove all of seed case and epidermis like a normal polishing operation, only germs are remained, the germs are allowed to germinate, and rice having such germinated germs is commercially provided as rice with germinated germs. With this, people who has a reluctance to eat brown rice can easily eat the rice with germinated germs, and since dietary fiber is reduced as compared with brown rice, people can eat the rice with germinated germs without worrying about loose bowels.

In the case of rice with germinated germs in which only germs are remained and they are germinated, however, since the seed case and epidermis are removed, aleuron layer or amylaceous albumen portion are exposed. Therefore, if the rice bran is not removed completely, the rice is deteriorated or smell of rice bran is generated, and when the rice with germs is packed and commercialized, there is a problem that it is difficult to enhance preservation easiness and produce quality.

Further, when the rice with germs is cooked, there is a problem that the remaining germ rate is reduced by 10 to 20% by polishing process before cooking.

SUMMARY OF THE INVENTION

It is an object of the present invention to provide a producing method of rice with germinated germs in which mouthfeel, outward appearance, digestibility and cooking easiness are enhanced and it is unnecessary to be washed before cooking.

To achieve the above object, the present invention provides a producing method of rice with germinated germs, comprising the steps of: adding water to brown rice to allow its germs to germinate to obtain germinated brown rice; applying warm and wet air (or applying steaming) to the brown rice with the germinated germs, thereby removing water attached to a surface of the rice; polishing a surface of the germinated brown rice by a grinding type and friction type rice-polishing machine while remaining the germinated germs to obtain rice with germinated germs, adding water of about 1 to 10% of rice weight to soften the rice surface; mixing the rice with granules whose granule size is set to a constant granule size smaller than that of the rice and which is heated to 60° C. or higher and stirring them; allowing rice bran remaining on a rice surface after polishing to be absorbed by the granule and removed; and separating the rice and granule from each other.

With this method, warm and wet air is distributed toward the germinated brown rice, thereby removing water from rice surface to facilitate polishing and then, all of seed case and epidermis are removed by a normal grinding type and friction type rice-polishing machine, polishing operation is carried out while remaining only germs to obtain rice with germinated germs. At that time, extremely thin aleuron layer and rice bran powder are attached to a recess on a surface of rice. Water of about 1 to 10% of rice weight is added to soften the rice surface, rice and granules which are formed into constant granule size smaller than grain size of rice and heated to a temperature of 60° C. or higher are stirred and mixed together so that rice bran remaining on the rice surface after polishing is allowed to be absorbed in the granules to remove the rice bran. With this, it is possible to produce rice with germinated germs in which the rice bran in the recess of the rice is completely removed, mouthfeel, outward appearance, digestibility and cooking easiness are enhanced and it is unnecessary to be washed before cooking. By omitting the washing process before cooking, the remaining rate of germs is enhanced.

Further, if a drying step for adjusting water of the obtained rice with germinated germs to 12 to 16% is added, it is possible to enhance the preservation easiness and produce quality when the rice with germinated germs is packed and commercialized.

DESCRIPTION OF THE PREFERRED EMBODIMENT

Figure 1:
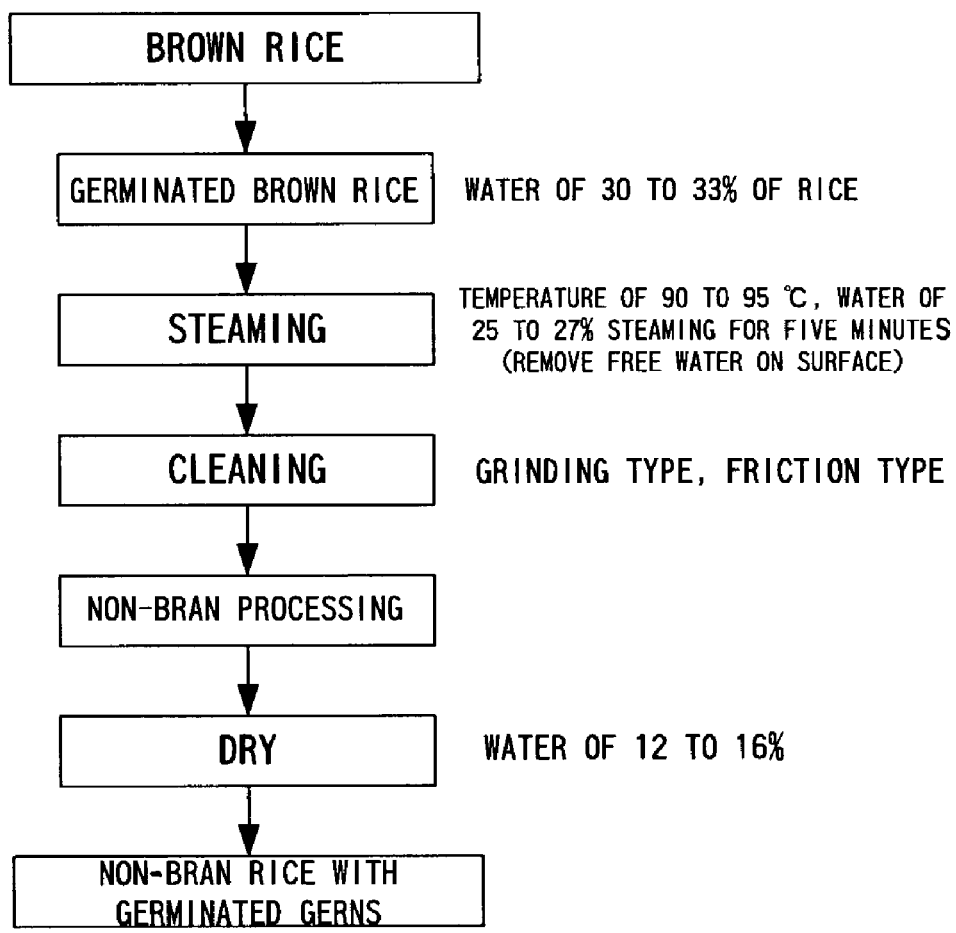
FIG. 1 is a flowchart showing a producing process of rice with germinated germs according to an embodiment of the present invention.

An embodiment of the present invention will be explained with reference to the drawings. FIG. 1 is a flowchart showing a producing process of rice with germinated germs according to the embodiment of the present invention.

First, 30 to 33% water by weight is added to normal brown rice to allow its germs to germinate, this germinated brown rice is subjected to steaming for five minutes by warm and wet air of a temperature of 90 to 95° C. and moisture of 25 to 27%. With this, water attaching to rice surface of the germinated brown rice can be removed to facilitate a subsequent polishing step. In a polishing step, a surface of the germinated brown rice is scratched by a normal grinding type rice-polishing machine and then, friction among granules is produced by a normal friction type rice-polishing machine to allow only germs to remain, seed case and epidermis are removed to obtain rice with germinated germs having yield of about 95 to 94%.

Water of about 1 to 10% of rice weight is added to the obtained rice with germinated germs to soften the rice surface, granules which are formed into constant granule size smaller than grain size of rice and heated to a temperature of 60° C. or higher and rice are stirred and mixed together so that rice bran remaining on the rice surface is allowed to be absorbed in the granules to remove the rice bran. The rice and the granules are separated from each other to control the yield to about 89 to 94%. With this processing, it is possible to obtain rice with germinated germs which need not be washed before cooking. If a drying step for adjusting water of the obtained rice with germinated germs to 12 to 16% is added, it is possible to enhance the preservation easiness and produce quality when the rice with germinated germs is packed and commercialized.

Figure 2:
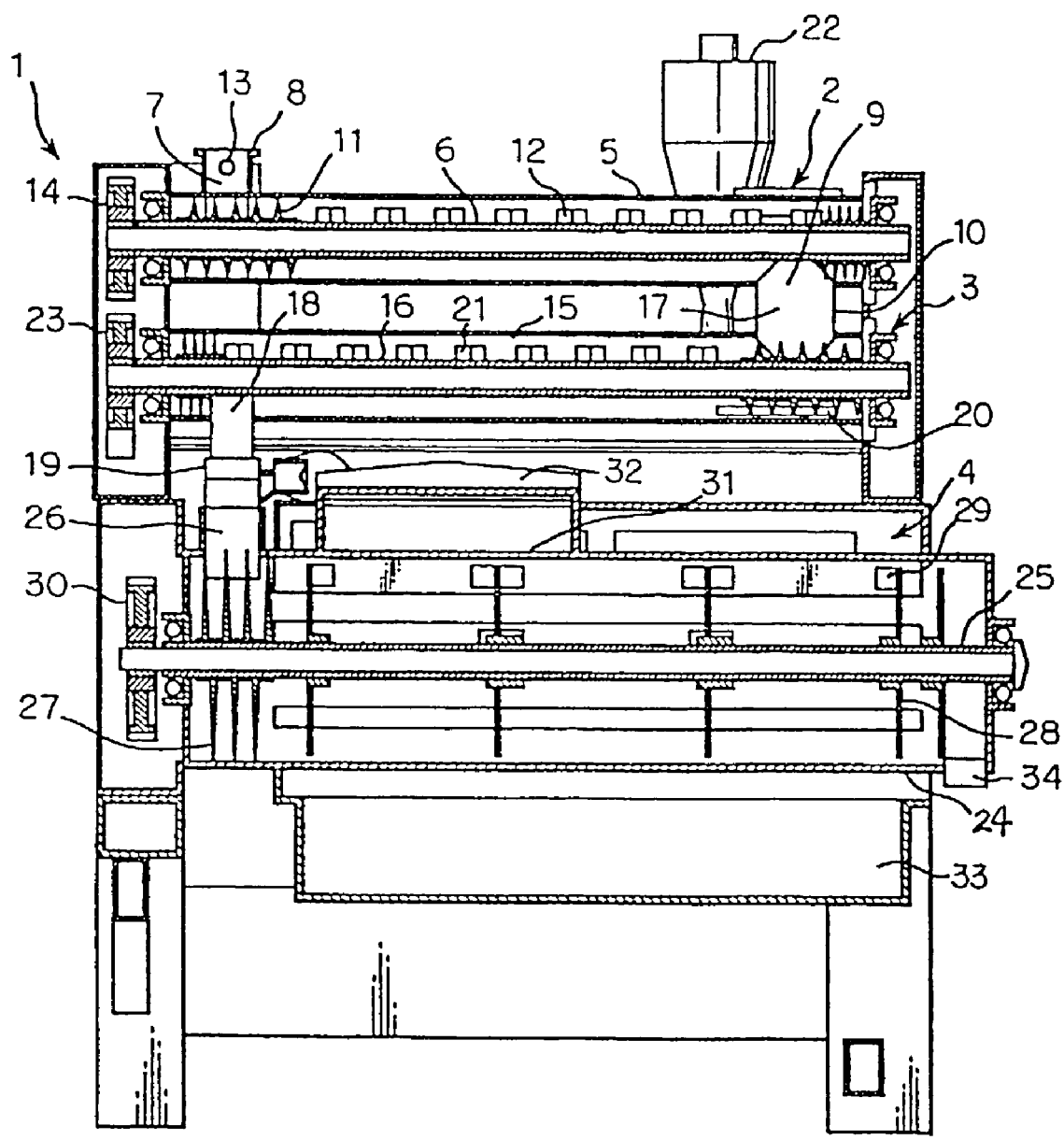
FIG. 2 is a vertical sectional view of a rice processing apparatus of rice with germinated germs which need not be washed before cooking.

FIG. 2 shows a rice processing apparatus of rice with germinated germs which need not be washed before cooking. The rice processing apparatus 1 comprises a wet type processing section 2, a granule mixing section 3 and a separation drying section 4 in this order from above. Rice with germinated germs polished by a normal grinding type and friction type rice-polishing machine to adjust the yield to about 95% passes through the wet type processing section 2, the granule mixing section 3 and the separation drying section 4 in this order, thereby obtaining rice with germinated germs having almost no rice bran on a rice surface.

In the wet type processing section 2, a screw shaft 6 is rotatably supported in a screw cylinder 5 which is laterally provided in an uppermost portion of the rice processing apparatus 1, a supply tube 8 extending upward is connected to a supply port 7 provided on one end of the screw cylinder 5, and a discharge tube 10 is connected to a discharge port 9 provided on the other end of the screw cylinder 5 such that the discharge cylinder 10 is suspended downward.

The screw shaft 6 is provided at its supply-starting end with a supply screw blade 11, and is provided at its other portion with a plurality of stirring blades 12. A spray port 13 for adding atomized water to incoming rice with germinated germs is arranged in the supply tube 8. A pulley 14 pivotally provided on one end of the screw shaft 6 is connected to a motor (not shown) through a belt.

The granule mixing section 3 is provided with a lateral screw cylinder 15 which is substantially the same as the screw cylinder 5 of the wet type processing section 2 below the wet type processing section 2. A screw shaft 16 is rotatably laterally supported in the screw cylinder 15. A supply port 17 is provided directly below the discharge port 9 of the wet type processing section 2, the discharge cylinder 10 is connected to the supply port 17, a discharge port 18 is provided on the transfer-completion end of the screw cylinder 15, and a discharge cylinder 19 is connected to the discharge port 18 such that the discharge cylinder 19 is suspended downward.

Like the above structure, a supply screw blade 20 is provided on a transfer-starting end of the screw shaft 16, and a plurality of stirring blades 21 which are the same as the wet type processing section 2 are pivotally provided on the other portions of the screw shaft 16. A granule supply hopper 22 is disposed on the transfer-starting end of the screw cylinder 15, and the hopper 22 is connected to the screw cylinder 15 through the supply screw blade 20. A pulley 23 pivotally provided on one end of the screw shaft 16 is connected to a motor (not shown) to each other through a belt.

In the separation drying section 4, a screen cylinder 24 having a large number of slits is laterally provided below the granule mixing section 3. A rotation shaft 25 is laterally supported in a screen cylinder 24. A supply port 26 is opened in the transfer-starting end of the screen cylinder 24, and the supply port 26 and the screen cylinder 24 of the granule mixing section 4 are connected to each other. A supply screw blade 27 is pivotally provided on the transfer-starting end of the rotation shaft 25, and a plurality of arms 28 are radially provided on several portions of the rotation shaft 25 other than the transfer-starting end. A plurality of long stirring blades 29 are supported by the arms 28. A pulley 30 pivotally provided on an upper end of the rotation shaft 25 is connected to a motor (not shown) to each other through a belt.

An air supply port 31 is provided at a portion of the screen cylinder 24 closer to its upper surface, and an air-supply duct 32 is connected to the air supply port 31. On the other hand, an outer cylinder for covering the screen cylinder 24 is provided. An air-discharge duct 33 is connected to the outer cylinder at a portion thereof closer to its bottom surface, and a product discharge port 34 is provided on a transfer-completion end of the screen cylinder 24.

Rice with germinated germs is introduced into the screw cylinder 5 connected to the supply tube 8 of the rice processing apparatus. The rice with germinated germs is polished such that the yield becomes about 95% by a grinding type and friction type rice-polishing machine such that germs are remained. Atomized water of 5% of the rice weight is sprayed toward the supplied rice with germinated germs from the spray port 13 which faces the supply tube 8. Then, the rice with germinated germs is transferred toward the transfer-completion end by the supply screw blade 11 which rotates 500 revolutions per minute, and is stirred by the stirring blades 12. By stirring the rice in this manner, the atomized water attaches to the rice surface uniformly, and the rice bran of the recess of the rice surface is softened.

Next, in the granule mixing section 3, rice is supplied from the discharge port 9 of the wet type processing section 2 into the screw cylinder 15 of the granule mixing section 3 through the discharge cylinder 10, and the rice is transferred toward the transfer-completion end by the supply screw blade 20 and the steering blades 21 which rotates 600 revolutions per minute while being stirred. At that time, granules in the granule supply hopper 22 are supplied into the screw cylinder 15 by the supply screw blade 20. The granule is obtained in such a manner that amylaceous granule such as tapioka is formed into alpha and is dried, thereby obtaining substantially spherical granule having hardness of 2 to 5 kgf/cm$^2$ and having constant granule size which is smaller than that of rice (it is preferable to set the granule size to 1 to 1.7 mm), the granules are supplied at a high temperature of 70 to 100° C. and are mixed with the rice with germinated germs. The mixing rate of the granule is about 50% with respect to the weight of rice.

The rice bran powder and the like attached to the rice with germinated germs which absorbs water and is softened in the previous step is formed into alpha at the instant when the rice bran comes into contact with high temperature granules, and is absorbed and removed by granules, and the rice bran does not attached to the surface of the rice with germinated germs again. At that time, there is effect that a temperature of the rice surface is lowered by latent heat of vaporization.

In the separation drying section 4, rice flowing down from the granule mixing section 3 through the discharge cylinder 19 is supplied into the screen cylinder 24 of the separation drying section 4 at a final step, and is transferred toward the transfer-completion end by the supply screw blade 27 which rotates 280 revolutions per minute and stirred by the stirring blades 29. At that time, the rice surface which is slightly wet is dried by air of about 40° C. entering from the air supply port 31 at 60 m$^3$ per minute, which facilitates separation of the rice from the granules.

The rice which passed through the screen cylinder 24 is discharged out from the product discharge port 34, the granule discharged from the slits of the screen cylinder 24 while being stirred is discharged out from the air-discharge duct 33 with air and is separated from each other by a back filter and then, granule size of the granule is uniformed and used as granule again.

By such a rice processing apparatus, the fine rice bran powder remaining in the recess of the rice with germinated germs which was difficult to be removed by a normal rice-polishing machine is softened by adding water in the wet type processing section 2, and the rice bran powder in the recess of the granule mixing section 3 is absorbed by the granules and peeled off. With this processing, the rice bran in the recess of the rice with germinated germs is completely removed, and waste water is not generated unlike a polishing operation with water added. Further, the seed case and epidermis are removed, the dietary fiber is reduced as compared with the brown rice, and it is possible to produce rice with germinated germs in which mouthfeel, outward appearance, digestibility and cooking easiness are enhanced, and the rice need not be washed before cooking.

According to the present invention, as described above, the producing method of rice with germinated germs comprises the steps of: applying warm and wet air to germinated brown rice which is obtained by adding water to brown rice to allow germs to germinate, thereby removing water attached to rice surface; polishing rice surface of the germinated brown rice to form rice with germinated germs while remaining germs by a grinding type and friction type rice-polishing machine; adding water of about 1 to 10% of rice weight to soften the rice surface; stirring granules whose granule size is set to a constant granule size smaller than that of the rice and which is heated to 60° C. or higher is stirred and mixed with the rice; allowing bran remaining on a rice surface after polishing to be absorbed by the granules and removed; and separating the rice and granules from each other. With this method, the rice bran in the recess of the rice with germinated germs is completely removed, and waste water is not generated unlike a polishing operation with water added. Further, the seed case and epidermis are removed, the dietary fiber is reduced as compared with the brown rice, and it is possible to produce rice with germinated germs in which mouthfeel, outward appearance, digestibility and cooking easiness are enhanced, and the rice need not be washed before cooking. Because the rice-washing step before cooking is omitted, the remaining rate of germs is enhanced.

Further, if a drying step for adjusting water of the obtained rice with germinated germs to 12 to 16% is added, it is possible to enhance the preservation easiness and produce quality when the rice with germinated germs is packed and commercialized.

What is claimed is:

1. A producing method of rice with a germinated germ, comprising:

adding water to a grain of brown rice to allow a germ thereof to germinate to obtain germinated brown rice;

applying warm and wet air to the brown rice with the germinated germ, thereby removing water attached to a surface of the rice;

polishing a surface of the germinated brown rice by a grinding type and friction type rice-polishing machine so that the germinated germ remains, to obtain rice with a germinated germ, adding water of about 1 to 10% of rice weight to soften the rice surface;

mixing the rice with granules having a constant granule size smaller than a granule size of the rice, the granules being heated to 60° C. or higher and stirring them;

allowing rice bran remaining on a rice surface after polishing to be absorbed by the granules and removed; and separating the rice and granules from each other.

2. The producing method of rice with a germinated germ according to claim 1, further comprising adjusting a moisture of the obtained rice with the germinated germ to 12 to 16%.

* * * * *